United States Patent [19]
Chen

[11] Patent Number: 5,458,223
[45] Date of Patent: Oct. 17, 1995

[54] BICYCLE HUB UNIT

[76] Inventor: Chun-Hsung Chen, No. 18-1, Nan-Yang Rd., Feng-Yuan City, Taichung Hsien, Taiwan

[21] Appl. No.: 255,441

[22] Filed: Jun. 8, 1994

[51] Int. Cl.[6] .................................................... F16D 41/30
[52] U.S. Cl. .......................................... 192/64; 301/110.5
[58] Field of Search ............................ 192/64; 301/110.5

[56] References Cited

U.S. PATENT DOCUMENTS

| | | | |
|---|---|---|---|
| 2,211,548 | 8/1940 | Schwinn | 192/64 |
| 4,226,317 | 10/1980 | Nagano et al. | 192/64 |
| 4,580,670 | 4/1986 | Nagano | 192/64 |
| 5,129,711 | 7/1992 | Chen | 301/110.5 |
| 5,163,740 | 11/1992 | Kawai et al. | 301/110.5 |

*Primary Examiner*—Rodney H. Bonck
*Attorney, Agent, or Firm*—Arnold, White & Durkee

[57] ABSTRACT

A bicycle hub unit includes a hub shell with an axial bore which has a first axial end portion and a second axial end portion opposite to the first axial end portion, A cone has an externally threaded tip portion and a head portion secured to the second axial end portion of the axial bore. A sprocket carrier is supported around the cone for rotation relative thereto in only one direction. The hub shell has an annular series of internal splines formed in the second axial end portion of the axial bore, and a radial inward flange projecting from an inner peripheral surface of the hub shell. A lock nut is disposed entirely within the axial bore and has an internally threaded portion, and an end surface bearing against the flange. The nut has a length shorter than that of the axial bore. The head portion of the cone is formed with an annular series of external splines meshing with the internal splines of the hub shell, and has an externally threaded and axially extending tubular extension which extends into the axial bore via the second axial end portion and which engages the internally threaded portion of the nut.

1 Claim, 5 Drawing Sheets

BICYCLE HUB UNIT

BACKGROUND OF THE INVENTION

1. Field of the Invention

This invention relates to a bicycle hub unit which is to be attached to the rear wheel of a bicycle and which enables its cone to be mounted reliably on a hub shell thereof so as to minimize wobbling of the cone relative to the hub shell when in use.

2. Description of the Related Art

The invention is an improvement of a conventional bicycle hub unit, as shown in FIGS. 1 and 2, which is to be attached to the rear wheel of a bicycle. The bicycle hub unit includes a hub shell 1 which has an axial bore 11 that has a first axial end portion and a second axial end portion opposite to the first axial end portion. The hub shell 1 is supported rotatably on a hub shaft (not shown) that is mounted securely on the axle of the rear wheel of the bicycle. The hub shell 1 further has an annular series of external splines 12 which are formed at an outer end surface of the second axial end portion of the axial bore 11 of the hub shell 1, and an annular shoulder 13 (see FIG. 2) which is formed on an inner peripheral surface of the hub shell 1 near the first axial end portion of the axial bore 11. A hollow bolt 2 extends through the axial bore 11 of the hub shell 1 and is sleeved on the hub shaft. The bolt 2 has an externally threaded tip portion 21 which extends out of the second axial end portion of the axial bore 11, and a head portion 22 which bears against the shoulder 13. A first bearing 3 is disposed within the first axial end portion of the axial bore 11 of the hub shell 1. A cone 5 includes a head portion which is sleeved on the external splines 12 of the hub shell 1 and which has an annular series of internal splines 51 (see FIG. 2) meshing with the external splines 12 of the hub shell 1. Accordingly, when assembled, the hub shell 1 is co-rotatable with the cone 5. The cone 5 further includes an externally threaded tip portion 52, two pairs of ratchet pawls 53 supported on an outer circumference of the cone 5, and an internally threaded portion 54 (see FIG. 2) formed on the inner circumference of the cone 5 and connected threadably to the externally threaded tip portion 21 of the bolt 2 so as to fix the cone 5 to the hub shell 1.

A sprocket carrier 6 is supported around the cone 5 and has an annular series of ratchet teeth 61 formed on an inner circumference thereof.

A waterproof ring 4 is disposed on one end of the sprocket carrier 6 around the second axial end portion of the axial bore 11, and abuts against the hub shell 1.

The ratchet pawls 53 are spring-biased and engage operably the ratchet teeth 61 such that the sprocket carrier 6 is co-rotatable with the cone 5 in a forward running direction for torque transmission, and is freely rotatable relative to the cone 5 in the opposite direction to enable inertial running of the bicycle. Thus, the sprocket carrier 6 can rotate relative to the cone 5 only in one direction.

A second bearing 7 is disposed within the sprocket carrier 6 and has an internally threaded portion 71 which is connected threadably to the externally threaded tip portion 52 of the cone 5.

A plurality of diametrically different sprockets 8, as shown in FIG. 3, are supported on the sprocket carrier 6 for co-rotation therewith.

In general, the hub shell 1 is made of a light metal, such as an aluminium alloy, which is relatively weak in strength. However, when the conventional bicycle hub unit is in use, the external and internal splines 12, 51 of the hub shell 1 and the cone 5 have to bear a relatively large force. The force is applied only on one side of the sprocket carrier 6 and the cone 5 so that only a few of the external and internal splines 12, 51 at the force-applied side of the cone 5 receive the force.

As a result, the cone 5 may wobble easily relative to the hub shell 1 when the bicycle hub unit is in use. To make matters worse, the farther the external and internal splines 12, 51 are located from the center of gravity of the hub shell 1, the more violent the cone 5 wobbles relative to the hub shell 1.

Further, because the hollow bolt 2 is relatively long, it increases the weight of the bicycle hub unit and is easily bent due to long-term use. Thus, the bent bolt 2 may result in deviation of the internal splines 51 of the cone 5 from the external splines 12 of the hub shell 1. As a result, the bolt 2 may increase the wobbling of the cone 5 relative to the hub shell 1.

SUMMARY OF THE INVENTION

The main objective of this present invention is to provide a bicycle hub unit which enables its cone to be mounted reliably on a hub shell thereof and to be located at a position near the center of gravity of the hub shell so as to minimize wobbling of the cone relative to the hub shell when in use.

Another objective of this present invention is to provide a bicycle hub unit which utilizes a shorter lock nut to replace the conventional hollow bolt for locking the cone on the hub shell so as to enhance the stability of the cone on the hub shell and so as to decrease the weight of the bicycle hub unit.

According to this invention, a bicycle hub unit includes a hub shell having an axial bore which has a first axial end portion and a second axial end portion opposite to the first axial end portion. A first bearing is mounted in the first axial end portion of the axial bore of the hub shell. A cone has an externally threaded tip portion and a head portion which is secured to the hub shell at the second axial end portion of the axial bore. A sprocket carrier is supported around the cone for rotation relative thereto in only one direction. A second bearing is disposed within the sprocket carrier and has an internally threaded portion which is connected threadably to the externally threaded tip portion of the cone. The hub shell has an annular series of internal splines which are formed in the second axial end portion of the axial bore, and a radial inward flange which projects from an inner peripheral surface of the hub shell interiorly of the internal splines. The bicycle hub unit further includes a lock nut which is disposed entirely within the axial bore of the hub shell and which has an internally threaded portion, and an end surface that bears against the flange of the hub shell. The lock nut has a length shorter than that of the axial bore of the hub shell. The head portion of the cone is formed with an annular series of external splines which mesh with the internal splines of the hub shell, and has an externally threaded and axially extending tubular extension which extends into the axial bore of the hub shell via the second axial end portion of said axial bore and which engages the internally threaded portion of the lock nut.

DETAILED DESCRIPTION OF THE DISCLOSURE

Other features and advantages of this invention will become apparent from the following detailed description of a preferred embodiment of this invention, with reference to the accompanying drawing, in which.

DETAILED DESCRIPTION OF THE DISCLOSURE

Figure 4:
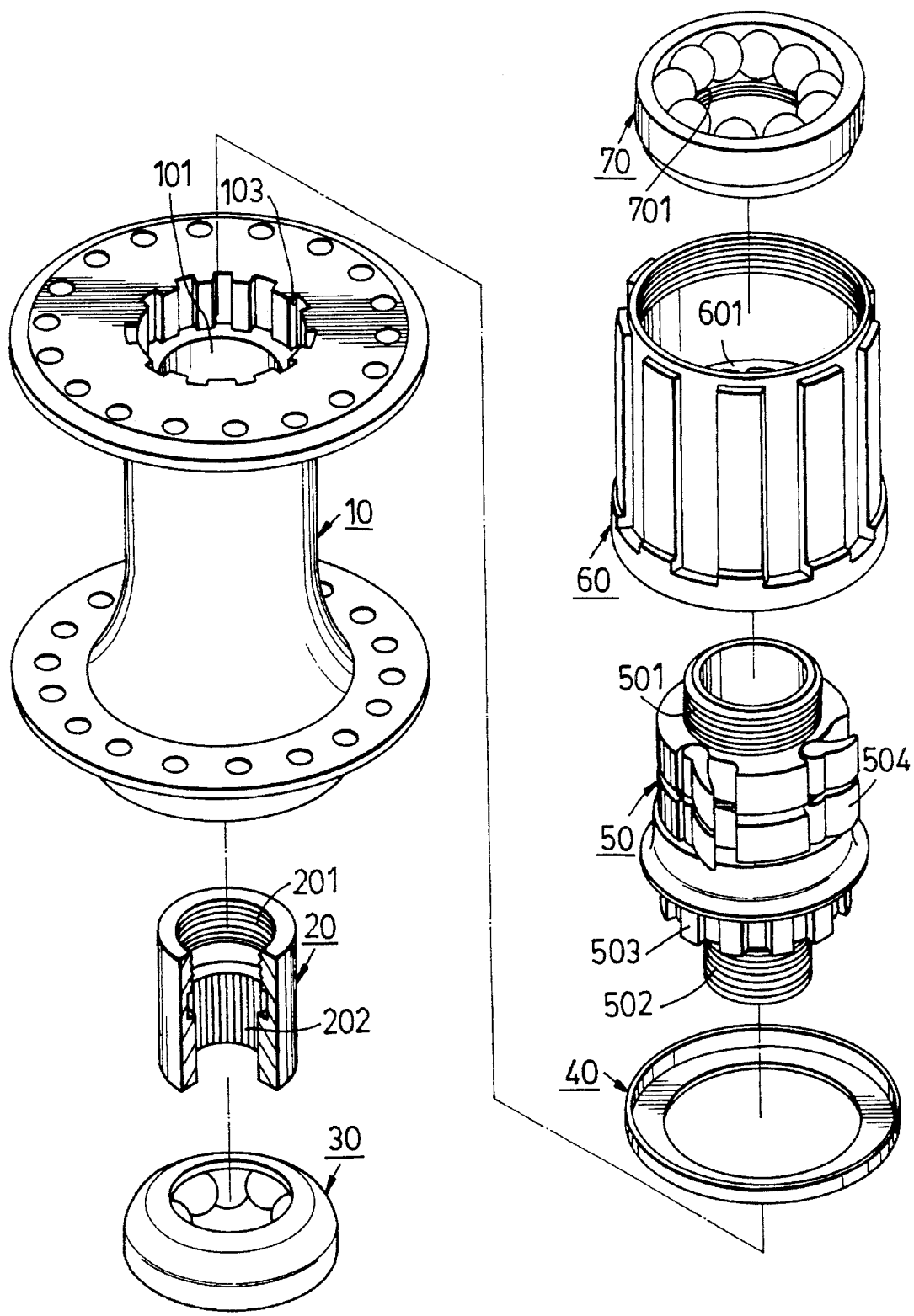
FIG. 4 is an exploded view showing a bicycle hub unit of the preferred embodiment of this invention.
Figure 5:
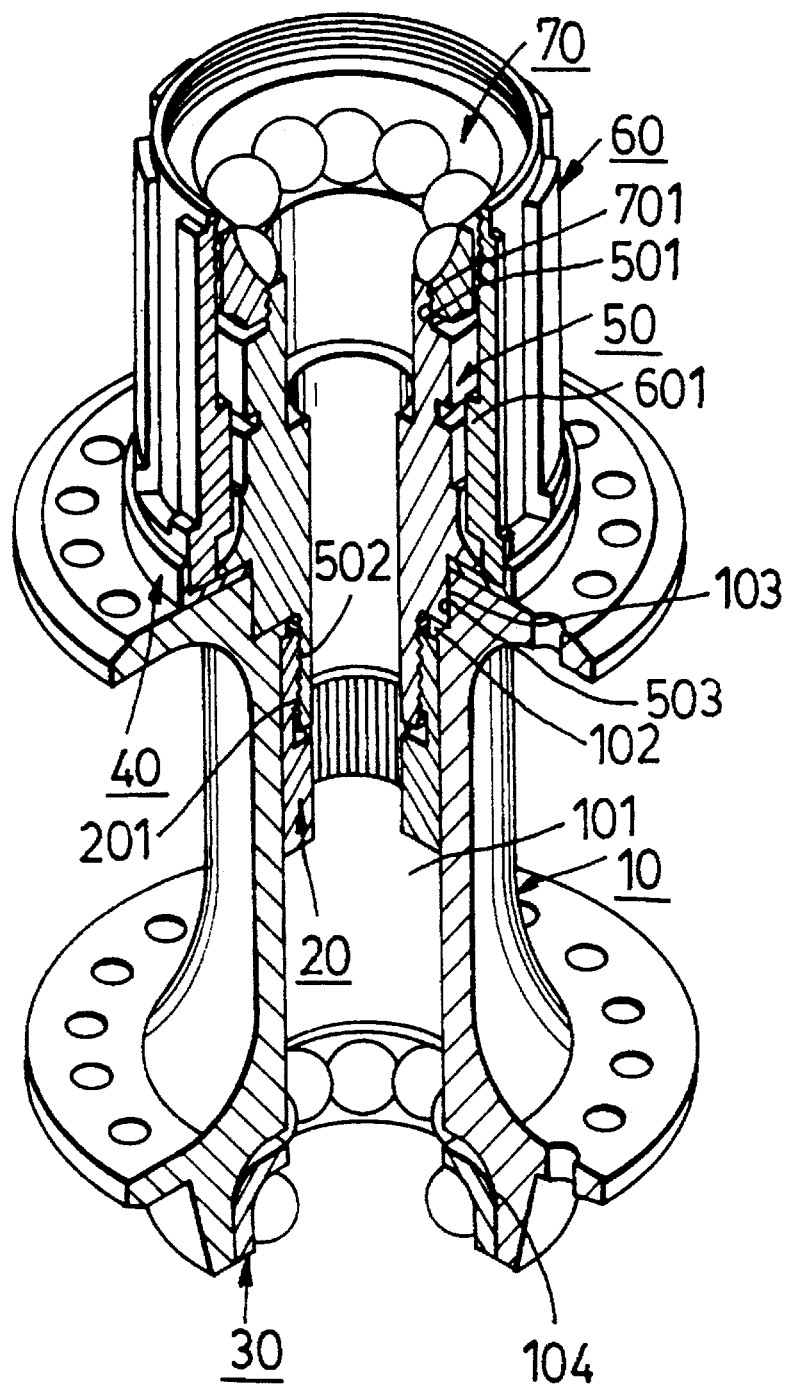
FIG. 5 is a partially cutaway perspective view showing the bicycle hub unit according to this invention.

Referring to FIGS. 4 and 5, a bicycle hub unit of the preferred embodiment of this invention is to be attached to the rear wheel of a bicycle, and includes a hub shell 10, a lock nut 20, a first bearing 30, a waterproof ring 40, a cone 50, a sprocket carrier 60, and a second bearing 70.

The hub shell 10 has an axial bore 101 which has a first axial end portion and a second axial end portion opposite to the first axial end portion. The hub shell 10 is supported rotatably on a hub shaft (not shown) which is mounted securely on the axle of the rear wheel of the bicycle. The first axial end portion of the axial bore 101 of the hub shell 10 has a recess section 104 (see FIG. 5) formed therein. The recess section 104 receives the first bearing 30 therein.

The first bearing 30 is a cup-and-cone type bearing similar to the bearing of the conventional bicycle hub unit in construction. The hub shell 10 further has an annular series of internal splines 103 which are formed in the second axial end portion of the axial bore 101, and a radial inward flange 102 (see FIG. 5) which projects from an inner peripheral surface of the hub shell 10 interiorly of the internal splines 103.

The lock nut 20 is disposed entirely within the axial bore 101 of the hub shell 10 and is sleeved on the hub shaft. The length of the lock nut 20 is shorter than that of the axial bore 101 of hub shell 10. The lock nut 20 has an internally threaded portion 201, an end surface that bears against the flange 102 of the hub shell 10, and an annular series of elongated teeth 202 that are formed on an inner peripheral surface of the lock nut 20 adjacent to the internally threaded portion 201. Thus, a tool is capable of being inserted into the axial bore 101 to engage the elongated teeth 202 so as to rotate the lock nut 20 relative to the hub shell 10 within the axial bore 101.

Figure 1:
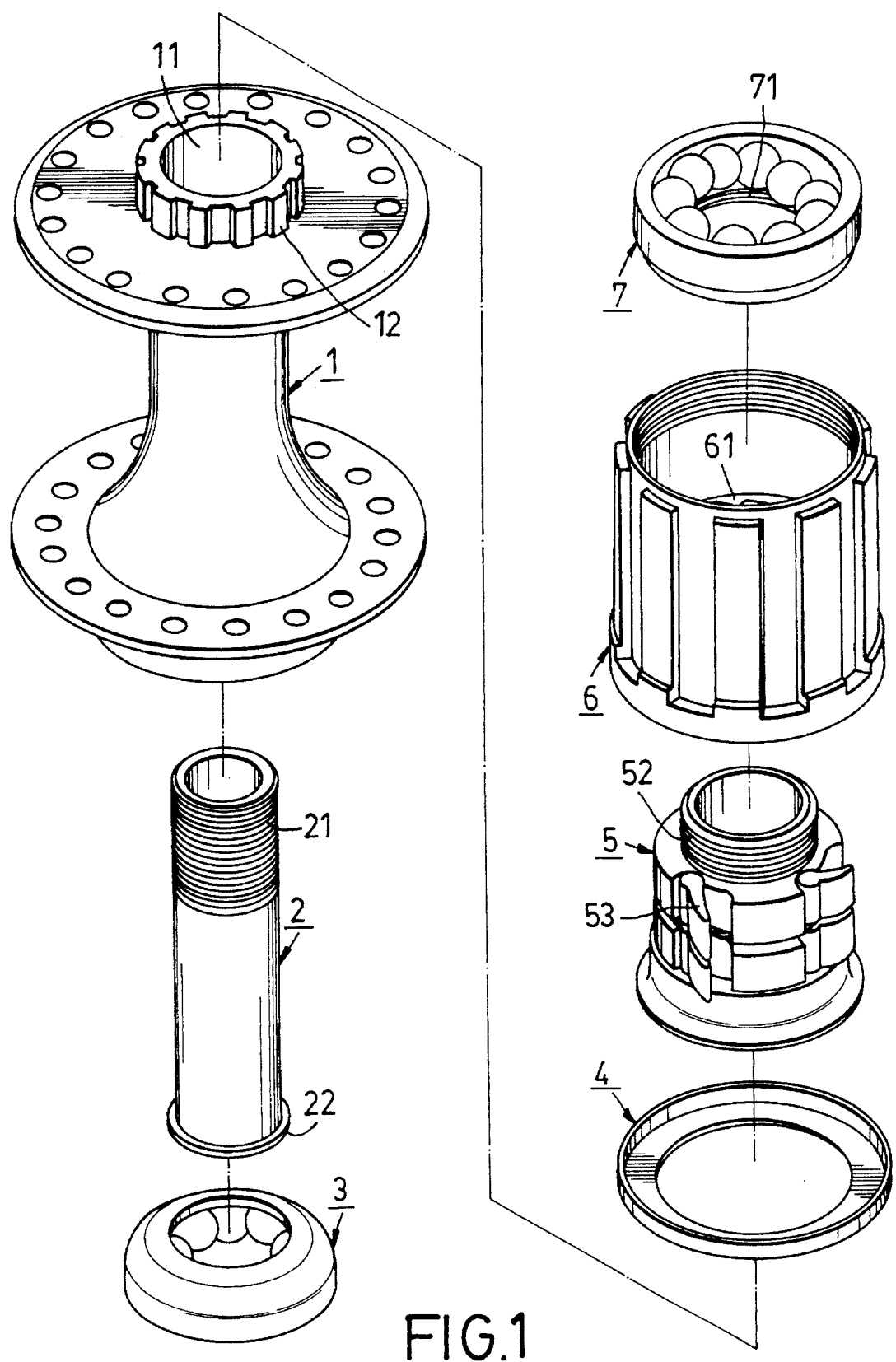
FIG. 1 is an exploded view of a conventional bicycle hub unit.
Figure 2:
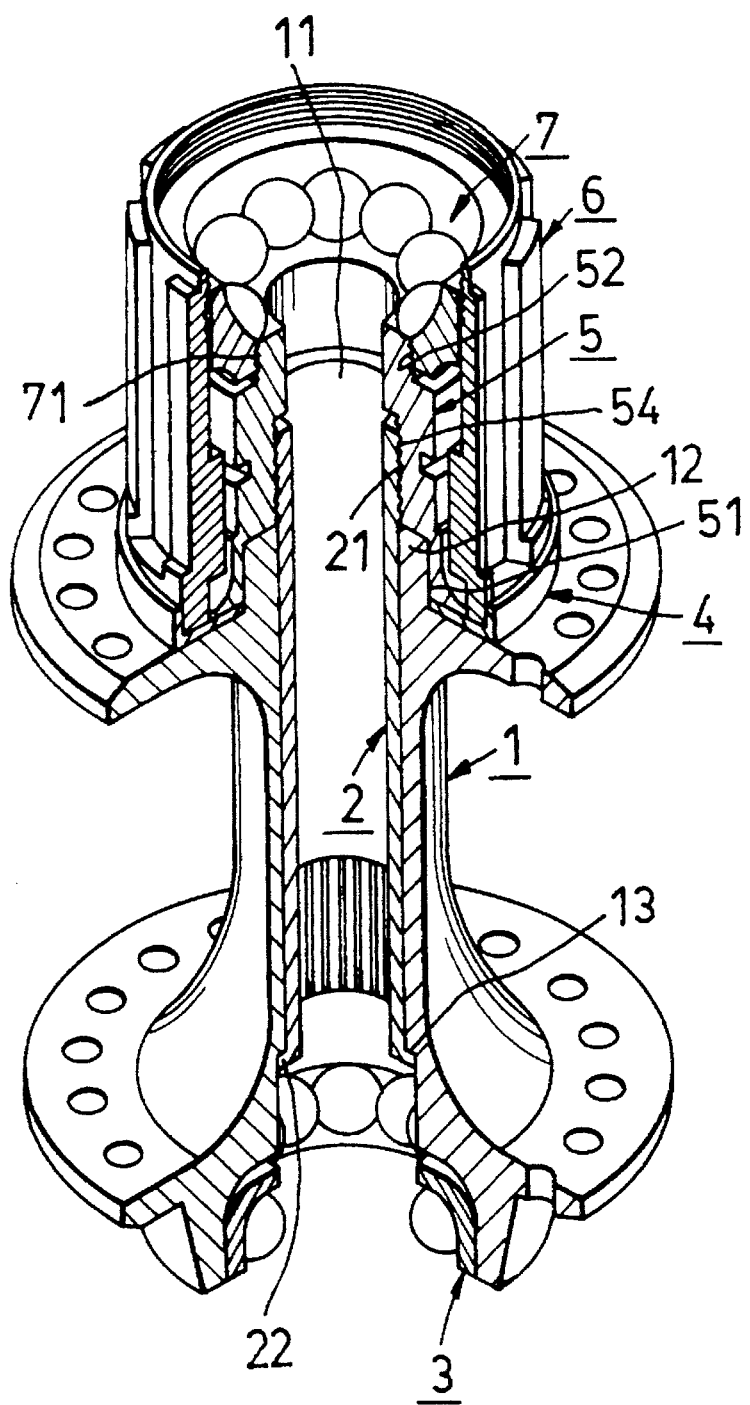
FIG. 2 is a partially cutaway perspective view showing the conventional bicycle hub unit.
Figure 3:
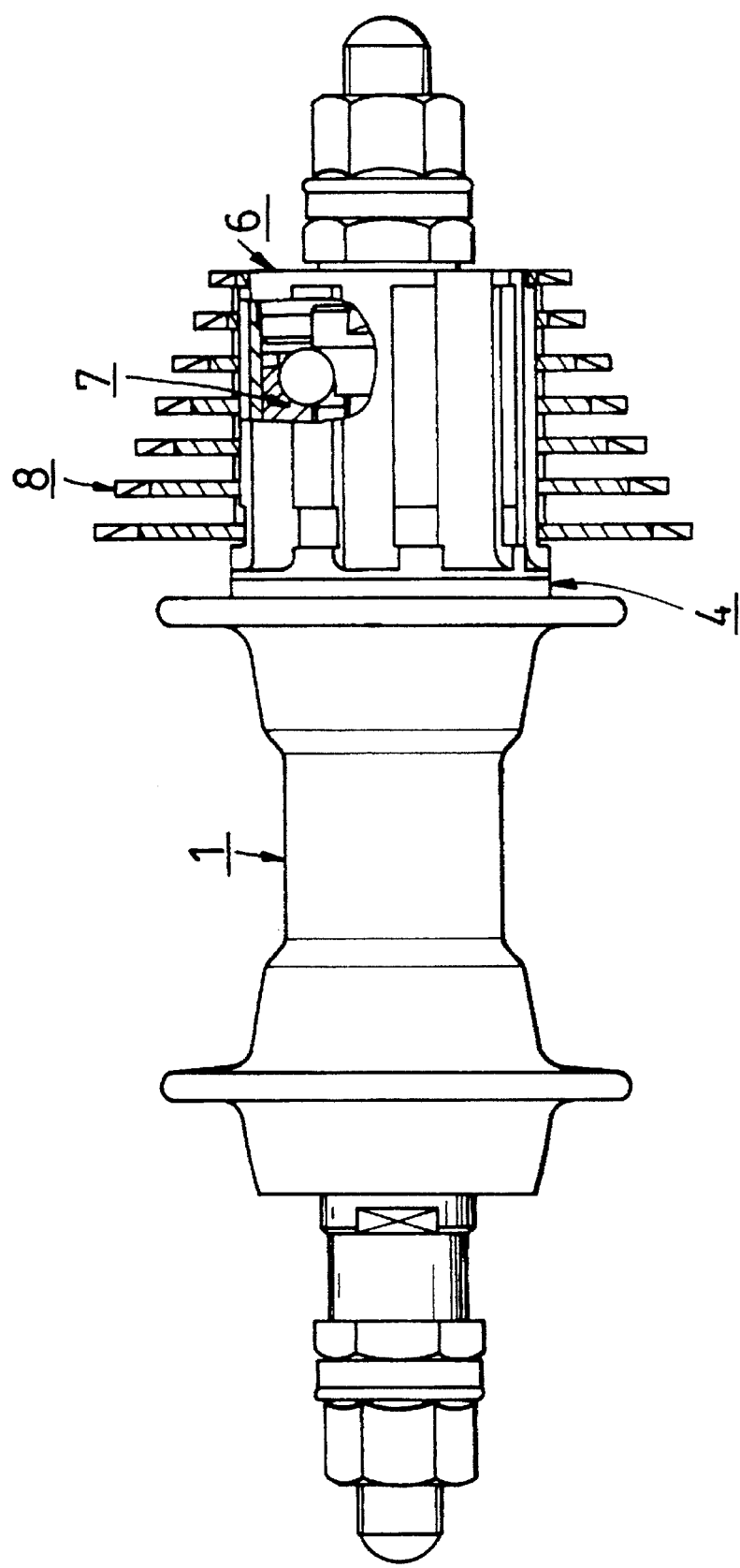
FIG. 3 is a schematic view illustrating a plurality of diametrically different sprockets supported around the sprocket carrier of the conventional bicycle hub unit.

The cone 50 has an externally threaded tip portion 501 and a head portion which is formed with an annular series of external splines 503 that mesh with the internal splines 103 of the hub shell 10. The head portion of the cone 50 further has an externally threaded and axially extending tubular extension 502. The tubular extension 502 extends into the axial bore 101 of the hub shell 10 via the second axial end portion of the axial bore 101 and engages the internally threaded end portion 201 of the lock nut 20 so as to fix the head portion of the cone 50 to the second axial end portion of the hub shell 10, thereby permitting the hub shell 40 to rotate synchronously with the cone 50. The cone 50 further includes two pairs of ratchet pawls 504 (see FIG. 1) which are supported on an outer circumference thereof.

The sprocket carrier 60 is supported around the cone 50 and has an annular series of ratchet teeth 601 formed on an inner circumference thereof.

A plurality of diametrically different sprockets (not shown) are supported on the sprocket carrier 60 for co-rotation therewith.

The ratchet pawls 504 of the cone 50 are spring-biased and engage operably ratchet teeth 601 such that the sprocket carrier 60 is co-rotatable with the cone 50 in a forward running direction for torque transmission, and is freely rotatable relative to the cone 50 in the opposite direction to enable inertial running of the bicycle. Thus, the sprocket carrier 60 can rotate relative to the cone 50 only in one direction.

The second bearing 70 is disposed within the sprocket carrier 60 and has an internally threaded portion 701 which is connected threadably to the externally threaded tip portion 501 of the cone 50. The second bearing 70 is also a cup-and-cone type bearing.

Referring to FIG. 5, the waterproof ring 40 is disposed on one end of the sprocket carrier 60 around the second axial end portion of the axial bore 101 and abuts against the hub shell 10.

Because the external splines 503 of the cone 50 engage the internal splines 103 of the hub shell 10 within the axial bore 101 of the hub shell 10, an effective and stable engagement between the internal and external splines 103, 503 is thus provided, thereby minimizing the wobbling of the cone 50 relative to the hub shell 10.

In addition, the assembly of the internal and external splines 103, 503 is located at a position closer to the center of gravity of the hub shell 10 than that at the conventional bicycle hub unit. Accordingly, when the bicycle hub unit is in use, the wobbling of the cone 50 relative to the hub shell 10 can be reduced further.

Preferably, the lock nut 20 has a length shorter than that of the hollow bolt which is utilized in the conventional bicycle hub unit. Accordingly, the use of the lock nut 20 can result in a lower weight for the bicycle hub unit and can reduce deviation of the external splines 503 of the cone 50 from the internal splines 103 of the hub shell 10, thereby reducing the wobbling of the cone 50 relative to the hub shell 10.

With this invention thus explained, it is apparent that numerous modifications and variations can be made without departing from the scope and spirit of this invention. It is therefore intended that this invention be limited only as indicated in the appended claims.

I claim:

1. A bicycle hub unit including a hub shell having an axial bore which has a first axial end portion and a second axial end portion opposite to said first axial end portion, a first bearing mounted in said first axial end portion of said axial bore, a cone having an externally threaded tip portion and a head portion which is secured to said hub shell at said second axial end portion of said axial bore, a sprocket carrier supported around said cone for rotation relative thereto in only one direction, and a second bearing which is disposed within said sprocket carrier and which has an internally threaded portion that is connected threadably to said externally threaded tip portion of said cone, wherein the improvement comprises:
said hub shell having an annular series of internal splines which are formed in said second axial end portion of said axial bore, and a radial inward flange which projects from an inner peripheral surface of said hub shell interiorly of said internal splines;
a lock nut being disposed entirely within said axial bore of said hub shell and having an internally threaded portion, and an end surface that bears against said flange of said hub shell, said lock nut having a length shorter than that of said axial bore of said hub shell; and said head portion of said cone being formed with an annular series of external splines which mesh with said internal splines of said hub shell, and having an externally threaded and axially extending tubular extension which extends into said axial bore of said hub shell via said second axial end portion of said axial bore and which engages said internally threaded portion of said lock nut.

\* \* \* \* \*